Figure 1:
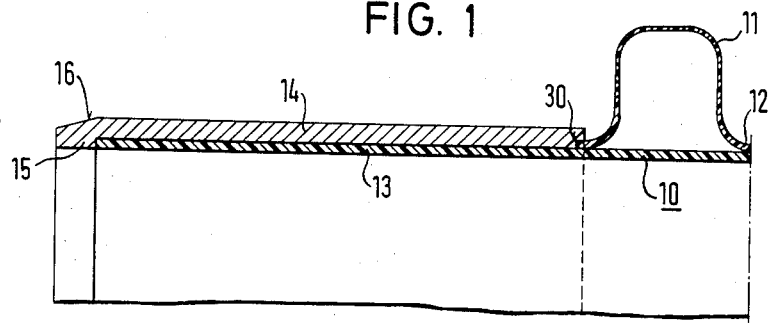

United States Patent [19]

Oltmanns et al.

[11] Patent Number: 4,591,193

[45] Date of Patent: May 27, 1986

[54] LINE PIPE OF SYNTHETIC MATERIAL ESPECIALLY FOR WASTE WATER

[75] Inventors: Heinrich Oltmanns, Edewecht; Axel Granz, Oldenbury; Willi Dalhoff, Edewecht; Rolf Othold, Oldenbury, all of Fed. Rep. of Germany

[73] Assignee: Oltmanns Ziegel und Kunststoffe GmbH, Edewecht, Fed. Rep. of Germany

[21] Appl. No.: 558,798

[22] Filed: Dec. 7, 1983

[30] Foreign Application Priority Data

Dec. 11, 1982 [DE]  Fed. Rep. of Germany ... 8234897[U]

[51] Int. Cl.[4] .............................................. F16L 9/04
[52] U.S. Cl. .................... 285/138; 285/294; 285/345; 285/369; 285/903
[58] Field of Search ............ 285/138, 226, 369, 345, 285/300, 301, 294, 297, DIG. 16, DIG. 4; 138/173

[56] References Cited

U.S. PATENT DOCUMENTS

| 217,927 | 7/1879 | Culver et al. ................ 285/292 |
| 3,313,319 | 4/1967 | Osborn et al. .............. 285/226 |
| 3,847,694 | 11/1974 | Stewing ....................... 285/297 |
| 4,453,354 | 6/1984 | Harbeke ........................ 285/64 |

FOREIGN PATENT DOCUMENTS

| 0663030 | 5/1963 | Canada ............................ 285/300 |
| 0932706 | 9/1955 | Fed. Rep. of Germany ...... 285/345 |
| 2838731 | 3/1980 | Fed. Rep. of Germany ... 285/DIG. 16 |
| 2840174 | 3/1980 | Fed. Rep. of Germany . |
| 0250160 | 6/1948 | Switzerland ...................... 285/297 |
| 0020625 | of 1894 | United Kingdom ............... 285/297 |
| 0438203 | 12/1935 | United Kingdom ................ 52/221 |
| 1112326 | 5/1968 | United Kingdom ....... 285/DIG. 16 |
| 1370679 | 10/1974 | United Kingdom ............... 138/121 |
| 0282833 | 6/1976 | U.S.S.R. ............................ 285/300 |

Primary Examiner—Cornelius J. Husar
Assistant Examiner—Eric K. Nicholson
Attorney, Agent, or Firm—Harness, Dickey & Pierce

[57] ABSTRACT

A line pipe of synthetic material for nominal sizes about 200 mm, especially a waste water pipe, comprising a separate smooth inner pipe and a transversely corrugated outer pipe, the pipes being telescoped into one another in such a manner that the wave troughs of the outer pipe come to lie essentially against the outer surface of the inner pipe, and connection means at the ends for the connection of several line pipes to form a pipeline via a socket joint, whereby the inner pipe has smooth cylindrical end portions projecting above the ends of the outer pipe, with a cylindrical sleeve of a predetermined outer diameter being pushed onto said end portions and fastened thereat by welding and/or adhesion.

18 Claims, 7 Drawing Figures

LINE PIPE OF SYNTHETIC MATERIAL ESPECIALLY FOR WASTE WATER

The invention relates to a line pipe of synthetic material for nominal sizes exceeding 200 mm, especially a waste water pipe, comprising a separate smooth inner pipe and a transversely corrugated outer pipe, said pipes being telescoped into one another in such a manner that the wave troughs of the outer pipe come to lie essentially in contact against the outer surface of the inner pipe, and connection means provided at the ends thereof for connecting several line pipes to form a pipeline via a socket joint.

Such a line pipe has become known approximately from the German disclosure letter No. 28 40 174 or the U.S. Pat. No. 4,037,626. The inner pipe is expanded at one end thereof like a socket. Such an expansion however is not free from problems. On the one hand it requires a separate forming step. On the other hand, the danger exists that with the inner pipe having too small a wall gage an expansion may lead to defects in the material. The particular advantage of the double pipe, however, consists in that the inner pipe may have very small wall gages and only serves to guide the flow of fluid. The pressure load from outside is accommodated by the corrugated outer pipe. The expansion at one end for the formation of a socket, therefore, conditions that the wall gage of the inner pipe must not fall below a certain value.

Another difficulty in connection with compound or double pipes of the type mentioned at the beginning consists in that the outer dimensions of the inner pipes are no longer covered by the standard dimensions normally predetermined for such pipelines. It may indeed be imagined to expand the socket to a nominal size corresponding to the outer diameter of the inner pipe. In such a case, however, it is not possible to connect the compound pipe to conventional line pipes formed, for instance, in one piece of synthetic material or earthenware and having the standard dimensions.

It is therefore the object of the invention to provide, for a pipeline, a line pipe in the form of a compound pipe which is simple to manufacture and may readily be connected to conventional standardized line pipes.

This object is attained in accordance with the invention in that the inner pipe is provided with smooth cylindrical end portions projecting above the ends of the outer pipe with a cylindrical sleeve having a predetermined outer diameter pushed onto said end portions and fastened thereon by welding and/or adhesion.

Same as is the case with the known line pipe, the inner pipe is extruded also in the case of the invention. But it retains its smooth cylindrical shape. The production of the inner pipe, therefore, is particularly simple and inexpensive.

Respectively pushed onto the smooth ends which slightly project above the outer pipe, are cylindrical sleeves which are fastened at the inner pipes by welding and/or adhesion. The ends of the line pipe according to the invention are therefore designed to be similar to each other. Each end may therefore be inserted into a socket of a conventional line pipe for waste water, for example. If several line pipes according to the invention are composed to form a line, commercially available pipe sockets of synthetic material may be used which are pushed onto the two sleeves of the line pipes abutting each other.

The invention offers the additional advantage that the inner pipe needs to be designed with a wall gage as required only to perform its function, i.e. of passing a fluid medium. The manufacture of the line pipe according to the invention thus may be accomplished at low manufacturing costs. The application and fixation of the separate sleeves which are pushed onto the ends of the inner pipe, may be performed with the aid of simple means.

According to one embodiment of the invention provision is made for the sleeves to have an inward pointing shoulder or radial flange coming to lie against the free end of the inner pipe and a slope with respect to the flange at the outer surface.

According to another embodiment of the invention provision is made for the ends of the corrugated outer pipe to come to lie in close contact against the facing end faces of the sleeves, preferably engaging within a recess formed by a slope of the sleeve and the inner pipe. This slope makes possible an easier pushing-in of the pipe into a connection socket.

As already mentioned above it is possible with the aid of the line pipes according to the invention to form a pipeline in a simple manner, with a separate connection socket provided having two axially spaced annular grooves for the accommodation of a sealing ring adapted to be pushed onto both sleeves abutting each other of the line pipes to be connected to each other. Such connection sockets are per se commercially available constructional members and are employed, for instance, in case an interruption has to be made for some reason in the course of a pipeline, which is subsequently removed again.

Another possibility of connecting the compound pipe according to the invention to conventional standardized line pipes of like nominal size consists in that a sleeve is pushed onto the projecting end of the inner pipe and said projecting end is expanded into a socket together with the sleeve, the inner diameter of said socket corresponding in a manner known per se to the outer diameter of the standardized tube. Thereupon, a sleeve is pushed onto the other end of the inner pipe in the manner as described above so that the inner pipe reaches the standard outer diameter.

In a third possibility of solution a socket may be designed of synthetic material in such a manner that it is pushed onto the projecting end of the inner pipe and fastened thereat. Finally, an extruded inner pipe may have a socket of greater wall gage and consisting of synthetic material injection-molded thereto. In both last-mentioned cases the other projecting end of the inner pipe may again have a sleeve applied thereto in the above-described manner.

The sleeve is preferably fastened by adhesion. This may be performed in such a way, for example, that an adhesive material is applied before to the surfaces to be connected to each other. Provision is made in an alternative embodiment of the invention for at least two axially spaced bores to be provided in the sleeve. The bores are in communication with annular grooves at the inner surface, said grooves being in turn connected to each other by narrow passages. In this manner, a liquid adhesive can be forced in via the one opening and may distribute over the circumference. The other opening serves as a means to allow the air to escape.

Figure 2:
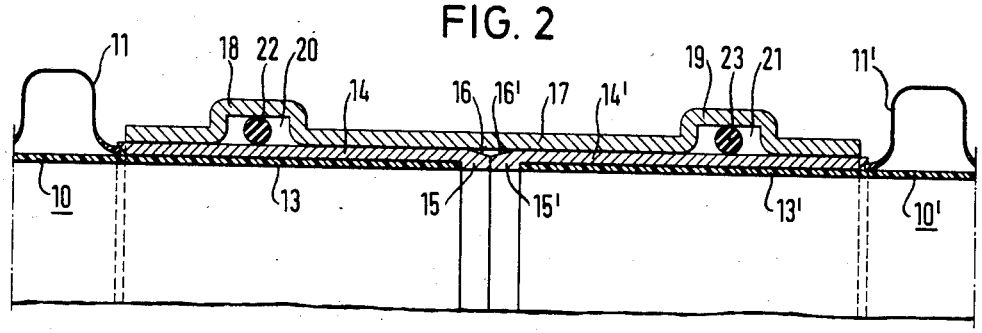
Figure 3:
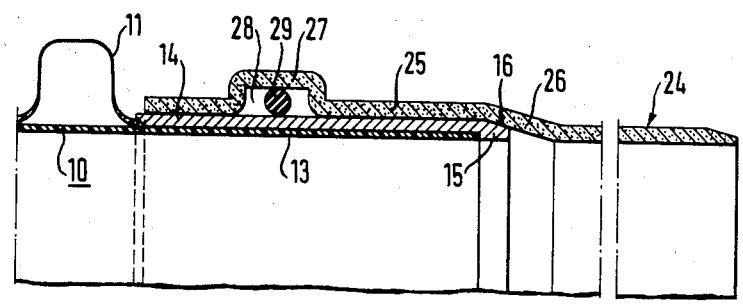
Figure 4:
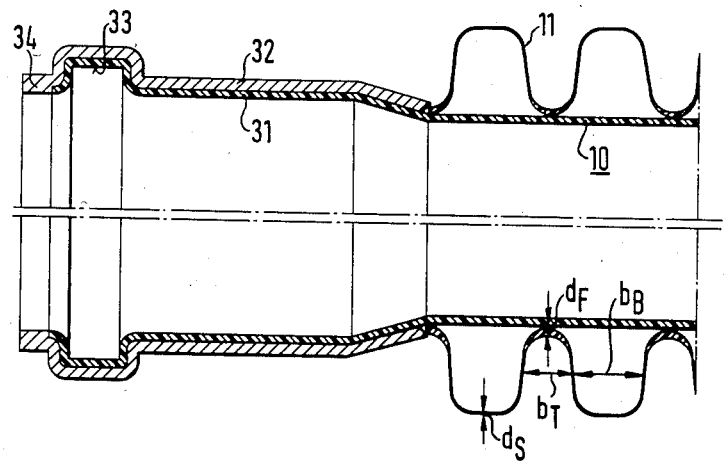
Figure 5:
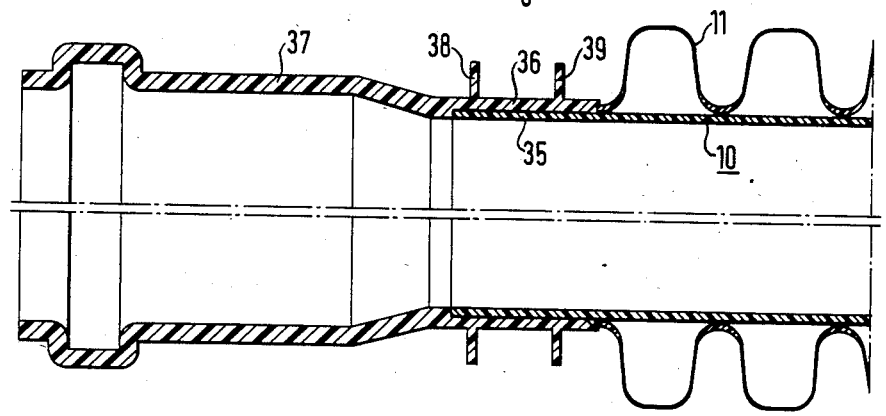
Figure 6:
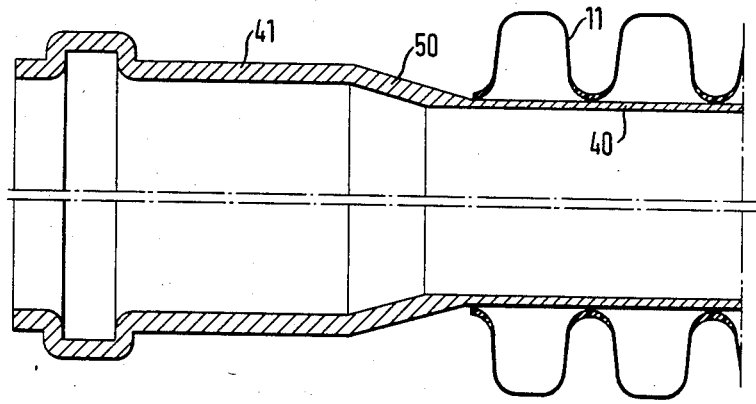
Figure 7:
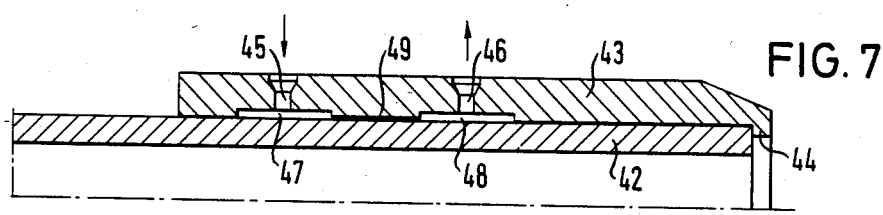

In the following, some examples of embodiment of the invention will be explained in more detail by way of drawings. In the drawings, FIG. 1 shows a sectional view of part of an end of a line pipe according to the invention, FIG. 2 shows a sectional view of a connection of two line pipes according to the invention, FIG. 3 shows a sectional view of the connection of a line pipe according to the invention to a conventional pipe, FIG. 4 shows a sectional view of the end of a line pipe according to the invention in another embodiment thereof, FIG. 5 shows a sectional view of the end of a line pipe according to the invention in a third embodiment thereof, FIG. 6 shows a sectional view of the end of a line pipe according to the invention in a fourth embodiment thereof, FIG. 7 shows a sectional view of the end of a line pipe according to the invention with the possibility of forming a connection by adhesion.

FIG. 1 shows in part a compound pipe comprising a smooth cylindrical inner pipe 10 of synthetic material and a corrugated pipe 11 arranged thereon, likewise consisting of synthetic material. The inner pipe 10 is extruded in a manner known per se to be a smooth cylindrical configuration. The corrugated pipe 11 is made in a manner known per se by extrusion followed by a subsequent forming step. The inner and outer pipes 10, 11 are assembled telescopically with the wave troughs 12 of the outer pipe coming to lie more or less against the outer surface of the inner pipe 10. Furthermore, the wave troughs may be spotwelded to the inner pipe, in order to obtain axial security relative to each other.

The inner pipe 10 projects above the outer pipe 11 at both ends by a portion 13, onto which a cylindrical sleeve 14 is pushed. The sleeve 14 has an inward pointing radial flange 15 at one end thereof, said flange coming to lie against the end face of the inner pipe 10; as will be seen from FIG. 1, the flange 15 and inner pipe 10 have the same inner diameter. Owing thereto, in the production of the pipe as shown, a positioning of the sleeve 14 on the inner pipe takes place automatically. The sleeve 14 is in addition provided with a slope 16 on the outer surface at the free end thereof. At the other end, the sleeve is tapered as shown at 30 at the inner surface thereof, so that an annular recess is formed in which the trough of the corrugation 11 may engage by the end face thereof.

The outer diameter of the sleeve 14 corresponds to the outer diameter of standard line pipes for waste water. As will be noted, the inner pipe 10 is formed with a relatively thin wall thickness. The inner pipe 10 need not be designed with a view to compression forces, because the latter are exclusively accommodated by the outer pipe 11. (What is meant are external compression forces because in the case of waste water there is no inner compression worth mentioning or not permitted, respectively.)

The other end of the pipe shown in part in FIG. 1 is built up in the same manner, so that a pipe connection may be formed according to FIG. 2.

In FIG. 2 like parts of the two pipes are provided with like reference numerals but primed in one case.

The compound pipes as shown in FIG. 2 are abutting against the flanges 15, 15'. A cylindrical socket 17 is pushed onto the outer surface of the cylindrical sleeves 14, 14', said socket being provided with axially spaced annular enlargements 18 and 19, respectively, thus forming annular grooves 20, 21. The annular grooves 20, 21 accommodate sealing O-rings 22 and 23, respectively. The sealing rings 22, 23 come to lie against the outer surface of the sleeves 14, 14'.

FIG. 3 shows a conventional one piece line pipe 24 of earthenware or synthetic material, which is formed with a single wall and correspondingly has quite a substantial wall thickness. The pipe 24 is expanded at one end thereof to form a socket 25, the inner diameter of which corresponds to the outer diameter of the pipe 24. As an abrupt transition cannot be obtained in the expansion for reasons connected with the material, there is a conical portion 26 provided between the pipe 24 and the socket 25. An annular expansion 27 of the socket 25 forms a groove 28 for the accommodation of a sealing ring 29. The sleeve 14, as already mentioned, has an outer diameter corresponding to that of a standardized sewer pipe and can therefore be fittingly pushed into the socket 25. The slope 16 in this operation comes to lie against the inner surface of the conical portion 26 so that there is a limit provided for the pushing-in movement.

In the embodiment according to FIG. 4 a sleeve 32 is pushed onto the projecting end 31 of the inner pipe 10. The portion 31 and the sleeve 32 are expanded like sockets by means of a suitable tool, so that the inner diameter of the socket corresponds to the specified outer diameter of a connection pipe such as the outer diameter of the sleeve 14 according to FIG. 1, for example. By expanding the sleeve 32 and the inner pipe portion 31 in a stronger degree, an annualar groove 33 is formed at the front end for the accommodation of an annular seal. As will furthermore be seen from FIG. 4, the sleeve 32 at the front end is also provided with a flange 34, said flange 34 having the end face of the inner pipe section 31 abutting against the shoulder thereof. As the inner diameter of the flange 34 and of the inner pipe 31 are the same, a steady transition of uniform diameter will be formed. As will furthermore be noted, a wave trough may again engage within the recess at the rear end of the sleeve 32.

In the embodiment as shown in FIG. 5 there is only a relatively short portion 35 formed to project above the outer pipe 11. Pushed onto the inner pipe portion 35 is the cylindrical end 36 of a socket 37 of synthetic material. For this purpose the portion 36 is provided with an inner portion of enlarged diameter, with the increase in diameter corresponding to the thickness of the inner pipe 10. The shoulder 36 thus formed in the portion 36 therefore serves as a limitation in the process of pushing onto the inner pipe. The remaining portion of the socket 37 is conventional and corresponds approximately to the design according to FIG. 4, but in this case the socket is formed in one piece. To be mentioned, however, are the two axially spaced annular ribs 38, 39. They provide a protection for the associated end of the outer pipe 11.

In the embodiment according to FIG. 6, an outer pipe 11 is utilized in the manner as described above. The inner pipe 40 is formed with the same wall thickness as the inner pipe 10 according to the above embodiments over the entire length of the outer pipe 11. It is, however, provided with a projecting socket 41 formed integrally therewith, said socket being formed integrally with the inner pipe 40 after extrusion, for example. In this manner, the inner pipe 40 and the socket 41 are made in one piece. The dimensions of the socket 41 are made in one piece. The dimensions of the socket 41 again correspond to the sockets of the above embodiments.

With all three embodiments according to FIGS. 4 to 6, a sleeve is suitably pushed onto the other end of the inner pipe 10, which is likewise provided with a projecting portion, said sleeve approximately corresponding to the sleeve of FIG. 1, so that the standardized outer diameter is obtained.

FIG. 7 shows a part-sectional view of an inner pipe with the portion 42 projecting above the outer pipe and a sleeve 43 pushed on in a manner similar to the embodiment according to FIG. 1. For this purpose the sleeve 43 is again provided with a radial flange 44. As will be noted from FIG. 7, the sleeve has two axially spaced passage holes 45, 46 in a way expanding outwardly. At the inner surface they are connected to annular grooves 47, 48 formed on the inner surface of the sleeve 43. Between the annular grooves 47, 48 the sleeve is slightly increased in diameter, so that an axial channel 49 results. It goes without saying that several pairs of holes 45, 46 may be circumferentially spaced on the sleeve 43. It furthermore goes without saying that instead of the circumferentially extending annular groove 49 several axial channels may be provided in circumferentially spaced arrangement.

It is possible with the aid of the arrangement shown to perform the adhesive connection between the sleeve 43 and the inner pipe 42 in a simple manner by mechanical means. For this purpose a liquid adhesive is forced perhaps into the hole 45. The escaping air exits via the opening 46. The adhesive may distribute over a considerable area of the sleeve and become cured. In this manner the sleeve 43 is safely fastened at the inner pipe portion 42.

It has been found that with a certain configuration of the corrugation of the outer pipe and a maximum amount of synthetic material optimum pressure relationships may be obtained. The crests of the waves are wider than the troughs the ratio being between 1.5 and 2.6. The wall thickness of the apices of the wave crests is smaller than the thickness at the foot of the troughs. This ratio preferably is between 1.1 and 2.1. In FIG. 4 these thicknesses are designated with $d_S$ and $d_F$. The widths are designated with $b_B$ and $b_T$. The flanks of the troughs and wave crests, respectively, are extremely steep and approximately normal with respect to the axis of the pipe. The angle included with the vertical is between 2° and 8°. It is essentially an angle of removal from the mold.

I claim:

1. A line pipe of synthetic material for nominal sizes above 200 mm such as a waste water pipe comprising a separate inner pipe and a transversely corrugated outer pipe having crests and troughs, the pipes being telescoped into one another in such a manner that the wave troughs of the outer pipe lie substantially against the outer surface of the inner pipe, and connection means at at least one of the ends of said line pipe for the connection of several line pipes to form a pipeline via a socket joint, characterized in that the inner pipe has a uniform external diameter cylindrical end portion projecting axially beyond one of the ends of said corrugated outer pipe and a cylindrical sleeve having an inner diameter complementary to the external diameter of and telescopically receiving said one of said end portions and fixed relative thereto.

2. A line pipe according to claim 1, characterized in that the sleeve is provided with a counterbored portion defining a flange engaging the adjacent end of the inner pipe and a tapered portion on the outer surface opposite the flange.

3. A line pipe according to claim 1, characterized in that at least one end of the corrugated outer pipe lies in close contact against the adjacent end face of the sleeves.

4. A pipeline consisting of several line pipes according to claim 1, characterized in that a separate union socket is provided having two axially spaced annular grooves each adapted to accommodate a sealing ring, said sleeve being adapted to be pushed onto abutting sleeves of adjacent ends of line pipes to be connected to each other.

5. Line pipe of synthetic material as set forth in claim 1 wherein the outer end of the sleeve is expanded in diameter from the remaining portion thereof to form a socket having an inner diameter approximately corresponding to the outer diameter of another sleeve.

6. A line pipe according to claim 5, characterized in that the end portion sleeve is counterbored to a diameter equal to the outer diameter of the respective end of the inner pipe and defines a flange abuttingly engaged with said inner pipe end.

7. A line pipe according to claim 5, characterized in that the socket enlargement is enlarged to form an annular groove between the ends.

8. A line pipe of synthetic material as set forth in claim 5, wherein the inner diameter of the socket is substantially the same as the outer diameter of the sleeve.

9. A line pipe according to claim 8, characterized in that the unenlarged portion of the sleeve is counterbored to receive the adjacent end of the inner pipe, said counterbore forming a flange engaging the adjacent inner pipe end.

10. A line pipe according to claim 8, characterized in that the remaining portion of the sleeve has at least one annular rib on the outer surface thereof.

11. A line pipe according to claim 5, characterized in that a trough portion of the outer pipe engages the end of the sleeve.

12. A line pipe according to claim 1, characterized in that the sleeve is provided with at least two axially spaced radial openings communicating with annular grooves on its inner surface adjacent the contained portion of the inner pipe and in that at least one communication passage is provided between the annular grooves.

13. A line pipe according to claim 1, characterized in that the flanks of the corrugation of the outer pipe extend approximately normal to the pipe axis, the ratio thickness $d_S$ of the wave apex to the thickness $d_F$ of the wave root being between 1.1 and 2.1 and the ratio of the width $b_B$ of the crests to the width $b_T$ of the troughs being between 1.5 and 2.4.

14. A line pipe according to claim 8, characterized in that a trough portion of the outer pipe engages the end of the sleeve.

15. A line pipe according to claim 5, characterized in that the sleeve is provided with at least two axially spaced radial openings communicating with annular grooves on its inner surface adjacent the contained portion of the inner pipe and in that at least one communication passage is provided between the annular grooves.

16. A line pipe according to claim 8, characterized in that the sleeve is provided with at least two axially spaced radial openings communicating with annular grooves on its inner surface adjacent the contained portion of the inner pipe and in that at least one communication passage is provided between the annular grooves.

17. A line pipe according to claim 3, wherein the sleeve and the adjacent end of the inner pipe define an annular recess receiving one end of the outer pipe.

18. A line pipe according to claim 11, wherein the sleeve and the adjacent end of the inner pipe define an annular recess receiving one end of the outer pipe.

* * * * *